United States Patent Office 3,524,732
Patented Aug. 18, 1970

3,524,732
POUR DEPRESSANT COMPOSITION
William M. Sweeney, Wappingers Falls, and Anthony L. Ippolito, Beacon, N.Y., assignors to Texaco Inc., New York, N.Y., a corporation of Delaware
No Drawing. Filed Dec. 13, 1965, Ser. No. 513,573
Int. Cl. C10l 1/16
U.S. Cl. 44—62  4 Claims This invention relates to a novel pour depressant composition, to a mineral oil composition containing same and to a method for manufacturing the pour depressant. The pour depressant is effective for substantially reducing the pour point of fuel oils, diesel oils, middle distillates and other liquid hydrocarbon oils. The pour depressant composition is also effective as an additive for fuels, such as gasoline, wherein the composition acts as a modifier of induction deposits.

Briefly, the novel pour depressant composition of the invention comprises a cracked ethylene-propylene copolymer consisting of ethylene and propylene in a mol ratio of 10:1 to 1:10 respectively having an intrinsic viscosity in the range of 0.2 to 0.7. The process of the invention involves reacting an ethylene-propylene copolymer consisting of polymerized ethylene and propylene in a mol ratio of 10:1 to 1:10 respectively having an intrinsic viscosity of at least 0.9 under cracking conditions to produce a cracked copolymer product having an intrinsic viscosity in the range of 0.2 to 0.7. The cracking process is preferably effected by heating the copolymer at a temperature in the range of 200 to 500° C. for a period ranging from about 15 seconds to about 10 hours.

Heating oils, diesel fuels and other liquid hydrocarbon oils employed in cold climates or exposed to low temperatures frequently require the use of an additive to maintain their fluidity or to meet essential pour point specifications for the oil in question. Additives effective for this purpose are known as pour depressants. While many such compositions are known, frequently they are not suitable either because of their high cost or high concentration required, or because of some undesirable property imparted by the additive. An effective pour depressant is one which will substantially reduce the pour point of a treated oil when used in a very small concentration and without imparting any undesirable effects.

It has now been discovered that certain relatively high molecular weight copolymers of ethylene and propylene when cracked in accordance with the process of the invention produce a reaction product that is highly effective as a pour depressant for mineral oil compositions even when employed in low concentratins.

The pour depressant of the invention is prepared from an ethylene-propylene copolymer consisting of polymerized ethylene and propylene in a mol ratio of 10:1 to 1:10 respectively having an intrinsic viscosity of at least 0.9. More desirably, the starting copolymer will have an intrinsic viscosity in the range from 1 to 5 and preferably from 1 to 2. The starting copolymer can also be characterized as having a molecular weight ranging from about 10,000 to about 1,000,000 with the preferred molecular weight range being from 25,000 to 200,000. A more suitable composition of the copolymer consists of polymerized ethylene and propylene in a mol ratio of 10:1 to 1.1 respectively with the preferred proportions being in the range of 1 to 5 mols of ethylene per mole of propylene.

The intrinsic viscosity ($\eta$) equals the natural log ln of the specific viscosity divided by the concentration in grams per 100 ml. The specific viscosity for this equation is the expression of a ratio of the viscosity of the solution divided by the viscosity of the solvent. This viscosity method is described in Ind. and Eng. Chem. 30, 1200 (1938). In this work, the solvent employed was toluene and the determinations made at 100° F. The molecular weights of the starting copolymer and of the cracked reaction product were determined by the "Vapor Phase Osmometer Method" described in J. Physics & Colloidal Chemistry 55:304 (1951). The proportions of ethylene and propylene in the cracked reaction product was determined by the Nuclear Magnetic Resonance Method described in Analytical Chemistry 31, 56 (1959).

Hydrocarbon oils of the invention will contain the pour depressant in a concentration ranging from about 0.001 to 1 weight percent. A preferred concentration of the pour depressant in mineral oil is an amount in the range of 0.01 to 0.1 percent.

Ethylene-propylene copolymers have been prepared by many methods. In general, a mixture of ethylene and propylene under atmospheric or super-atmospheric pressure is reacted in the presence of a catalyst, such as a Zeigler-Natta catalyst, to produce the ethylene-propylene copolymer product. Copolymers having a wide range of molecular weights can readily be prepared by varying the olefin concentration, the catalyst employed, the concentration of the catalyst, the polymerization reaction temperature and the time of reaction.

The ethylene-propylene copolymer and prescribed composition is cracked to produce the pour depressant of the invention. This is preferably accomplished thermally, i.e. by heating the ethylene-propylene copolymer to a temperature in the range of 200 to 500° C. and holding the copolymer at this temperature until the copolymer has been cracked. Generally, cracking is effected by maintaining the copolymer in the indicated temperature range for a period of time ranging from about 15 seconds to 10 hours although longer periods may be used. It is preferable, however, to effect thermal cracking in from about 3 to about 30 minutes at a temperature in the range of 300 to 400° C. Thermal cracking of the ethylene-propylene copolymer is conducted in any suitable vessel or reaction zone which can be maintained in the noted temperature range. Alternatively, the copolymer can be thermally cracked by adding it to a carrier, such as mineral oil, and the entire mixture treated as noted above. Thermal cracking of the copolymer in a mineral oil carrier gives a pour depressant-oil mixture which is convenient to handle and use.

The pour depressant of the invention has also been prepared by catalytically cracking the copolymer of prescribed composition. The copolymer is contacted with a catalyst and maintained at an elevated temperature until the ethylene-propylene copolymer has been substantially cracked to the product having pour depressant properties. This is accomplished in substantially less time and at a lower temperature than that required to effect thermal cracking.

Many catalysts are effective for cracking the copolymer to the desired product. Suitable catalysts include the Friedel-Crafts catalysts, fuller's earth, silica alumina, chromia alumina, molybdena, bauxite, silica magnesia and catalysts generally effective for catalytically cracking petroleum streams. The cracking catalyst may also be effectively employed dissolved or dispersed in a solvent or liquid carrier.

The cracked ethylene-propylene copolymer effective as a pour depressant is characterized by having an intrinsic viscosity in the range of 0.2 to 0.7 and preferably in the range of 0.4 to 0.6. The cracked product can also be generally characterized by a molecular weight in the range of 2,000 to 6,000 and an iodine number in the range of 1.5 to 40.

The preparation of pour depressant reaction products is described in the following examples.

EXAMPLE I

An ethylene-propylene gas mixture in proportions ranging from 0.1 to 1.0 mol of ethylene per mol of propylene was scrubbed by passing the mixture through a tower containing glass beads wet with 50% aqueous KOH and thence through a tower packed with Drierite. The dried gas mixture was passed into purified n-heptane at a rate of one liter per minute to saturate the solvent with the mixture while the solvent was being maintained at about 40° F. Following saturation of the solvent with ethylene and propylene, the gas mixture was continuously added to the vigorously stirred solvent at a steady rate of one liter per minute. Two polymerization catalysts were added to the reaction mixture: "Catalyst A," a 20% n-heptane solution of diethyl aluminum chloride and "Catalyst B," a 20% n-heptane solution of tri-n-butyl vanadate.

After an induction period of about a minute, the reaction began accompanied by a temperature rise in the reaction mixture and a drop in the off-gas rate. Following cessation of the reaction, the polymerization reaction mixture was successively washed with aqueous hydrochloric acid and with water to remove the catalyst color. The copolymer product was recovered from its solution in the following ways.

A portion of the ethylene-proplyene copolymer solvent mixture was successively treated with several volumes of an anti-solvent, namely, methanol. The precipitated copolymer was washed with further quantities of methanol to remove the polymerization solvent and then dried on a steam plate. The copolymer had a molecular weight of about 10,000 and an ethylene to propylene mol ratio of about 2 to 1.

A portion of the dried copolymer was thermally cracked by heating this portion to a temperature of 667° F. (353° C.) for 5 to 10 minutes. Another portion of the dried copolymer was added to a refined mineral oil and the mixture heated to 667° F. for 5 to 10 minutes to produce a mixture of thermally cracked copolymer in the mineral oil carrier. Both of these products were effective pour point depressants when added to hydrocarbon oils.

A separate portion of the ethylene-propylene copolymer-solvent mixture was placed in a distillation apparatus together with a quantity of thermally-stable, refined mineral oil. The polymerization solvent was distilled off and after removal of this solvent heating of the pot was continued until the temperature of the copolymer-refined mineral oil mixture was brought to about 667° F. Heating was continued for 5 to 10 minutes to effect thermal cracking of the copolymer in the mineral oil mixture. The thermally cracked copolymer mixture in mineral oil carrier produced in this fashion was also effective as a pour depressant when blended into middle distillates.

The ethylene-propylene mixture in the above example could be handled in still a different way. Specifically, the ethylene-propylene copolymer-solvent mixture can be mixed with sufficient anti-solvent to cause polymer separation from the polymerization solvent. The copolymer, now in the form of a moderate viscosity oil because of the inclusion of solvent and anti-solvent, is pumped to a still and a thermally-stable, refined mineral oil added prior to removal of the solvent and anti-solvent by distillation. Heating is continued in the necessary range to effect thermal cracking to produce an effective pour depressant product in a mineral oil carrier.

EXAMPLE II

A gaseous mixture of propylene and ethylene in a mol ratio of 2.35:1 respectively was passed into normal heptane maintained at a temperature of 40° F. The gas mixture was continuously added at a rate of one liter per minute. One-half a milliliter of Catalyst A, consisting of a 20% normal-heptane solution of diethyl aluminum chloride, and one-half a milliliter of Catalyst B, consisting of 20% n-heptane solution of tri-n-butyl vanadate, were added to the heptane polymerization solvent to initiate the polymerization reaction. After 5 minutes, an additional one-half milliliter of Catalyst A was added to the polymerization solvent. The reaction product was heated with 50% aqueous hydrochloric acid, washed with water and then washed with methanol. Four grams of the copolymer product were obtained having an Iodine No. of 3.2 and an ethylene to propylene mol ratio of about 1.5 to 1.

The copolymer was heated to 665° F. and maintained at this temperature for ten minutes to effect thermal decomposition. Infrared spectra showed that the product was amorphous. The cracked product had an Iodine No. of 7 and a mol ratio of ethylene to propylene of 1.5 to 1 respectively.

The foregoing pour depressant was added to middle distillate oils to determine its effect on the pour point. Fuel Oil A normally has a pour point of −15° F. and Fuel Oil B a pour point of −10° F. in the absence of a pour depressant.

When the pour depressant of this example was added to the above heating oils in a concentration of 100 p.t.b. (pounds per thousand barrels), about 0.03 weight percent, the pour point of Oil A was reduced to −70° F. and the pour point of Oil B reduced to −55° F. When the pour point depressor was employed at a concentration of 50 pounds per thousand barrels, the pour point of Oil A was reduced to −45° F. and the pour point of Oil B was reduced to −20° F. The original uncracked polymer at 100 p.t.b. reduced the pour point of Oil A to −40° F. and did not affect the pour point of Oil B.

EXAMPLE III

A gaseous mixture of propylene and ethylene in a mol ratio of 1.65 to 1 respectively was passed into normal heptane maintained at an initial temperature of 42° F. The gas feed rate was one liter per minute. One milliter of Catalyst A and one-half milliliter of Catalyst B both described in Example I above were added to the polymerization solvent to initiate the polymerization reaction and an additional one-half milliliter of Catalyst A was added after 5 minutes and the polymerization reaction continued for a total of 20 minutes. The polymerization reaction mixture was treated with methyl alcohol to precipitate the reaction product resulting in a yield of 6 grams of the copolymer product having an intrinsic viscosity of about 1.37 and an ethylene to propylene mol ratio of 2.5 to 1.

The copolymer product was heated to 667° F. in a test tube and maintained at this temperature for 6 minutes to effect thermal cracking of the copolymer. Infrared spectra showed the thermally cracked reaction product to be amorphous. The product had an intrinsic viscosity of about 0.438 and an Iodine No. of 4.2.

When the pour depressant of this example was added to Fuel Oils A and B described above in a concentration of 100 pounds per thousand barrels, the pour point of Fuel Oil A was reduced to −55° F. and the pour point of Fuel Oil B was reduced to −50° F. When the additive was added to Fuel Oil A in the amount of 25 pounds per thousand barrels, the pour point of Fuel Oil A was reduced to −35° F.

The original uncracked copolymer above depressed Oil A to −25° F. at 100 p.t.b. and Oil B to −20° F. at 100 p.t.b.

EXAMPLE IV

A gaseous mixture of propylene and ethylene in the mol ratio of 1.235 to 1 was passed into n-heptane polymerization solvent maintained at an initial temperature of 40° F. at a rate of 1 liter per minute. One milliliter of Catalyst A and one-half milliliter of Catalyst B described above were added to the polymerization solvent to initiate the reaction. An additional one-half milliliter of Catalyst A was added after 6 minutes and the polymerization continued for a total of 10 minutes. The mixture containing the reaction product was treated with methyl alcohol and a yield of 7 grams of the copolymer obtained having an ethylene to propylene mol ratio of 2 to 1.

The copolymer product of this example was heated to 667° F. and maintained at this temperature for a period of about 7 minutes to effect thermal cracking of the copolymer. When the product of this example was added to Fuel Oils A and B described above in a concentration of 100 pounds per thousand barrels of oil, the pour point of Fuel Oil A was reduced to −70° F. and the pour point of Fuel Oil B was reduced to −50° F.

The original uncracked copolymer at 100 p.t.b. reduced the pour point of Oil A to −45° F. and that of Oil B to −15° F.

EXAMPLE V

A gaseous mixture of ethylene and propylene in a mol ratio of 1.235 to 1 was passed into tetrachloroethylene polymerization solvent maintained at an initial temperature of 40° F. at a gas feed rate of one liter per minute. One milliliter of Catalyst A and one-half milliliter of Catalyst B were added to initiate the polymerization reaction and an additional one-half milliliter of the Catalyst A was added after 8 minutes. The polymerization reaction product had an intrinsic viscosity of 1.52.

A refined mineral oil was added to a portion of the reaction product in an amount equivalent to the amount of cracked copolymer calculated to be in the reaction product and the tetrachloroethylene stripped off. The mixture remaining was then heated to a temperature of 667° F. and maintained at this temperature for ten minutes to effect thermal cracking of the copolymer.

The cracked polymer content of the oil-polymer mixture was found to be 53% by dialysis. Analysis of the mixture indicated that the product was amorphous and that the mixture had a molecular weight of 695.

A separate portion of the copolymer was thermally cracked in the absence of mineral oil. It had an intrinsic viscosity of 0.588.

When the pour depressant of this example was added to Fuel Oil A at an active concentration level of 50 pounds per thousand barrels, the pour point of Fuel Oil A was reduced to −30° F.

The foregoing examples illustrate the striking effectiveness of the cracked copolymers of the invention as pour depressants for mineral oil compositions. Obviously, many modifications of the foregoing invention may be made without departing from the spirit and scope thereof and, therefore, only such limitations should be imposed as are indicated in the appended claims.

We claim:

1. A fuel oil composition comprising a major proportion of a mineral oil having a high pour point containing a minor amount effective to substantially lower the pour point of a composition prepared by reacting ethylene and propylene in a mole ratio from 10:1 to 1:10 respectively under vigorous stirring in the presence of a combination of polymerization catalysts to produce a copolymer having a molecular weight from about 10,000 to 1,000,000 and subjecting said copolymer to cracking at a temperature in the range of 200 to 500° C. to produce a cracked ethylene-propylene copolymer having a molecular weight in the range of 2,000 to 6,000.

2. A fuel oil composition according to claim 1 containing about 0.001 to 1 weight percent of said cracked copolymer composition.

3. A fuel oil composition according to claim 1 in which said copolymer is cracked in the presence of a refined mineral oil.

4. A fuel oil composition according to claim 1 in which said polymerization catalyst is a combination of diethyl aluminum chloride and tri-n-butyl vanadate.

References Cited

UNITED STATES PATENTS 2,379,728   7/1945   Liebe et al. _____ 44—62

DANIEL E. WYMAN, Primary Examiner

Y. H. SMITH, Assistant Examiner

U.S. Cl. X.R.

44—80